US012673558B2

(12) United States Patent
Lee

(10) Patent No.: US 12,673,558 B2
(45) Date of Patent: Jul. 7, 2026

(54) APPARATUS AND METHOD FOR CONTROLLING MOTOR-BASED TORQUE VECTORING

(71) Applicants: HYUNDAI MOTOR COMPANY, Seoul (KR); KIA CORPORATION, Seoul (KR)

(72) Inventor: Sang Hyup Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 155 days.

(21) Appl. No.: 18/371,056

(22) Filed: Sep. 21, 2023

(65) Prior Publication Data

US 2024/0351449 A1 Oct. 24, 2024

(30) Foreign Application Priority Data

Apr. 20, 2023 (KR) ........................ 10-2023-0052178
May 19, 2023 (KR) ........................ 10-2023-0064706

(51) Int. Cl.
B60L 15/20 (2006.01)

(52) U.S. Cl.
CPC ....... B60L 15/2036 (2013.01); B60L 2240/22 (2013.01); B60L 2240/423 (2013.01); B60L 2240/463 (2013.01); B60L 2250/20 (2013.01)

(58) Field of Classification Search
CPC ............. B60L 15/2036; B60L 2240/22; B60L 2240/423; B60L 2240/463; B60L 2250/20; B60L 2220/42
See application file for complete search history.

(56) References Cited

U.S. PATENT DOCUMENTS

| | | | | |
|---|---|---|---|---|
| 6,273,003 B1* | 8/2001 | Benker | ...................... | B61F 5/22 |
| | | | | 105/199.2 |
| 2010/0023194 A1* | 1/2010 | Okubo | .................. | B60W 30/20 |
| | | | | 477/3 |
| 2022/0041067 A1* | 2/2022 | Isami | ....................... | B60L 15/20 |
| 2023/0124981 A1* | 4/2023 | Kim | ....................... | B60W 30/02 |
| | | | | 701/70 |
| 2024/0092185 A1* | 3/2024 | Zhao | ................... | B60L 15/2036 |

FOREIGN PATENT DOCUMENTS

| | | | | |
|---|---|---|---|---|
| CN | 110254251 A | * | 9/2019 | .......... B60L 15/2063 |
| CN | 210337596 U | * | 4/2020 | |
| KR | 2021-0010729 A | | 1/2021 | |

OTHER PUBLICATIONS

English translation of Luo et al. (CN 210337596) (Year: 2020).*
English translation of Su et al. (CN 110254251) (Year: 2019).*

* cited by examiner

*Primary Examiner* — Kyle J Kingsland
(74) *Attorney, Agent, or Firm* — MCDONNELL BOEHNEN & BERGHOFF LLP

(57) ABSTRACT

An apparatus for controlling motor-based torque vectoring includes one or more processors, and a storage medium storing instructions configured to cause the one or more processors to obtain a target yaw moment following a target yaw rate, distribute the target yaw moment to a wheel-based target wheel torque, and convert the wheel-based target wheel torque into a motor-based motor torque. The instructions are configured to cause the one or more processors to convert the wheel-based target wheel torque into a motor-based motor torque using a mapping relationship between a motor torque and a wheel torque.

16 Claims, 10 Drawing Sheets

1

APPARATUS AND METHOD FOR CONTROLLING MOTOR-BASED TORQUE VECTORING

CROSS REFERENCE TO RELATED APPLICATIONS

This application claims benefit of priority to Korean Patent Application No. 10-2023-0052178 filed on Apr. 20, 2023, and Korean Patent Application No. 10-2023-0064706 filed on May 19, 2023, in the Korean Intellectual Property Office, the disclosures of which are incorporated herein by reference in its entirety.

BACKGROUND

1. Field

The present disclosure relates to an apparatus and a method for controlling motor-based torque vectoring.

2. Description of Related Art

Conventional mechanical or clutch-based torque vectoring uses mechanical limited slip differential (mLSD), electronic LSD (eLSD), and a twin clutch.

Among these, with the exception of the twin clutch, the remainder have a structure in which left and right torque distribution modules are added to an open differential to transmit a torque in one direction (from a wheel with a high wheel spin to a wheel with a low wheel spin) to decrease torque on the wheel with the large wheel spin and to increase torque on the wheel with the low wheel spin. Accordingly, when there is driving torque, the torque is regarded as a maximum range, and left and right torques may be distributed within the maximum range, but since the left and right torques cannot be independently controlled, a desired vehicle's behavior cannot be created.

The twin clutch is a system based on left and right independent clutches and may perform left and right independent control in a certain region, but this is also possible only when there is a driving torque, and when the clutch is fastened to the left and right wheels at the same time, a situation occurs in which the left and right wheels are restrained identically to the LSD, resulting in only one-way control freedom.

In order to solve the above-described problem, motor-based torque vectoring has recently been researched and developed. In the case of the motor-based torque vectoring, control such as Proportional-Integral-Derivative (PID) is generally performed, but simple PID control alone cannot produce desired performance in an actual vehicle.

Furthermore, motor control is performed by performing feedback for control for each hardware platform of an electric vehicle, which requires new performance tuning when changing hardware or developing new vehicle control logic.

SUMMARY

An aspect of the present disclosure is to provide an apparatus and a method for controlling motor-based torque vectoring that can reduce the hassle of newly tuning vehicle performance individually for each of various hardware platforms, and provides a motor-based torque vectoring control device and that can be commonly applied to various hardware platforms.

Additionally, an aspect of the present disclosure is to provide an apparatus and a method for controlling motor-based torque vectoring that can suppress vibrations of an electric vehicle and a resulting driver's sense of heterogeneity in a marginal situations (e.g., a turning situation with a large lateral acceleration (Ay) or a situation in which an oversteer starts to occur, or a drift situation), and that can eliminate the sense of heterogeneity due to the remaining lateral slip angle and ensure straightness of a vehicle when a steering angle is switched to a neutral state (OnCenter or Neutral) in the turning situation.

According to an aspect of the present disclosure, an apparatus for controlling motor-based torque vectoring includes one or more processors, and a storage medium storing instructions configured to cause the one or more processors to obtain a target yaw moment following a target yaw rate, distribute the target yaw moment to a wheel-based target wheel torque, and convert the wheel-based target wheel torque into a motor-based motor torque, wherein the instructions are configured to cause the one or more processors to convert the wheel-based target wheel torque into a motor-based motor torque using a mapping relationship between a motor torque and a wheel torque.

According to an aspect of the present disclosure, a method for controlling motor-based torque vectoring includes a first operation of obtaining a target yaw moment following a target yaw rate, a second operation of distributing the target yaw moment to a wheel-based target wheel torque, and a third operation of converting the wheel-based target wheel torque into a motor-based motor torque, wherein in the third operation, the wheel-based target wheel torque is converted into a motor-based motor torque using a mapping relationship between a motor torque and a wheel torque.

According to an aspect of the present disclosure, provided is a computer-readable storage medium on which a program for executing the method on a computer is recorded.

According to an embodiment of the present disclosure, a motor-based motor torque and an RPM of a motor may be input at a wheel-based torque and a wheel speed to obtain a wheel-based target wheel torque, and the wheel-based target wheel torque may be converted into a motor-based motor torque using a mapping relationship between a motor torque and a wheel torque, which can reduce the hassle of performing mapping individually on each of various hardware platforms, and can be applied universally to various hardware platforms. In this case, when the motor torque and a motor RPM are input from a control logic, universality may be secured by converting a corresponding signal into the wheel-based wheel torque and the wheel speed and receiving the signal.

Furthermore, according to an embodiment of the present disclosure, when a difference between a current value and a previous value of an integral (I) control value for PID control is greater than or equal to a preset threshold according to a driving situation, the threshold may be limited to an integral (I) control value, thereby suppressing a vibration of an electric vehicle and a resulting driver's sense of heterogeneity in a limit situation (e.g., a drift situation) due to a rapid change in a steering angular speed.

Furthermore, according to an embodiment of the present disclosure, when a steering angle is changed back to a neutral state (OnCenter or Neutral), the integral (I) control value is reduced by a ratio at which the target yaw rate decreases, thereby eliminating the sense of heterogeneity caused by the remaining lateral slip angle and secure the straightness of the vehicle.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figures 1A, 1B, 1C:
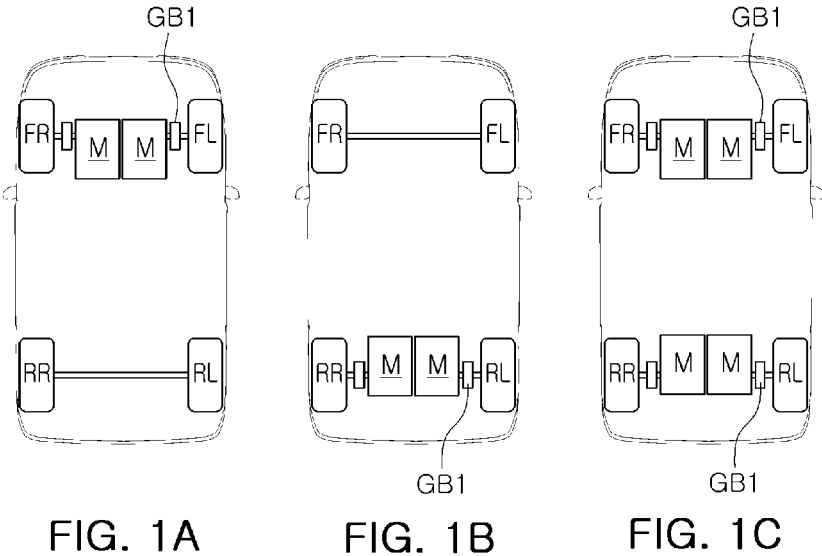
FIGS. 1A, 1B, 1C, 2A, 2B, 2C, 3A, 3B, and 3C are views illustrating various hardware platforms applied to a motor-based electric vehicle according to an embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. In the drawings, the shapes and dimensions of elements may be exaggerated for clarity, and the same reference numerals will be used throughout to designate the same or like elements.

Hereinafter, in the present disclosure, an electric vehicle denotes a vehicle in which wheels may be driven by a motor.

FIGS. 1-3 are views illustrating various hardware platforms applied to a motor-based electric vehicle according to an embodiment of the present disclosure. The aforementioned hardware platform may be a platform capable of independently controlling torques of each of four wheels using a motor. On the other hand, FIG. 4 illustrates a mapping relationship between a motor-based motor torque and a wheel-based wheel torque according to an embodiment of the present disclosure. FIGS. 4A and 4B illustrate mapping the motor-based torque to the wheel-based wheel torque, and FIGS. 4C and 4D illustrate mapping the wheel-based wheel torque to the motor-based motor torque.

In an embodiment, a hardware platform illustrated in FIG. 11C may include a first hardware platform for driving each of a pair of left and right wheels by a combination of a pair of drive motors M and a gearbox GB1. FIG. 1A denotes front wheel driving, FIG. 1B denotes rear wheel driving, and FIG. 1C denotes four-wheel driving.

As illustrated in FIGS. 1A-1C and FIG. 4A, a torque of a drive motor M provided in each wheel (i.e., a motor-based torque) may be multiplied by a gear ratio (GR) 201 of the gearbox GB1, may be converted into wheel torques (i.e., a wheel-based torque) of each wheel, and may be then applied to each wheel.

Figures 2A, 2B, 2C:
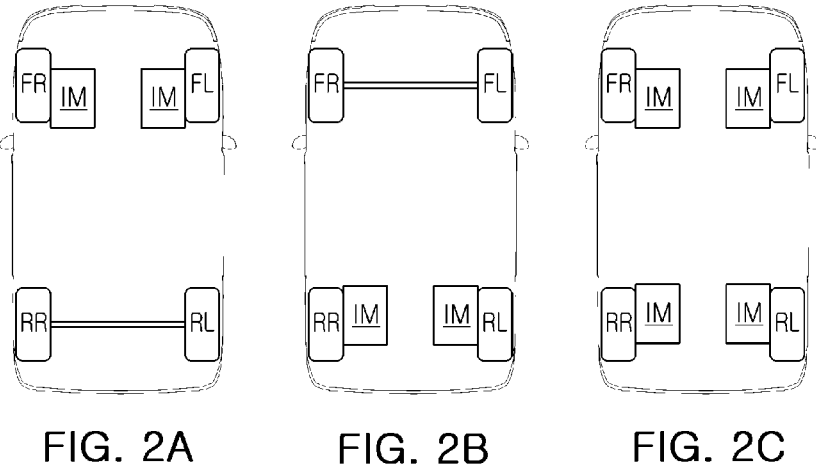

In another embodiment, a hardware platform illustrated in FIGS. 2A-2C may include a second hardware platform for driving each of a pair of left and right wheels with an in-wheel motor (IM). FIG. 2A denotes front wheel driving, FIG. 2B denotes rear wheel driving, and FIG. 2C denotes four-wheel driving.

As illustrated in FIGS. 2A-2C and FIG. 4A, torques of drive motors (i.e., the in-wheel motor (IM)) included in each wheel may be directly applied to each wheel. That is, in the case of the second hardware platform, since the in-wheel motor (IM) is directly fastened to the wheel, the gearbox does not exist, thereby mapping the motor-based torque and the wheel-based torque at a 1:1 ratio.

Figures 3A, 3B, 3C:
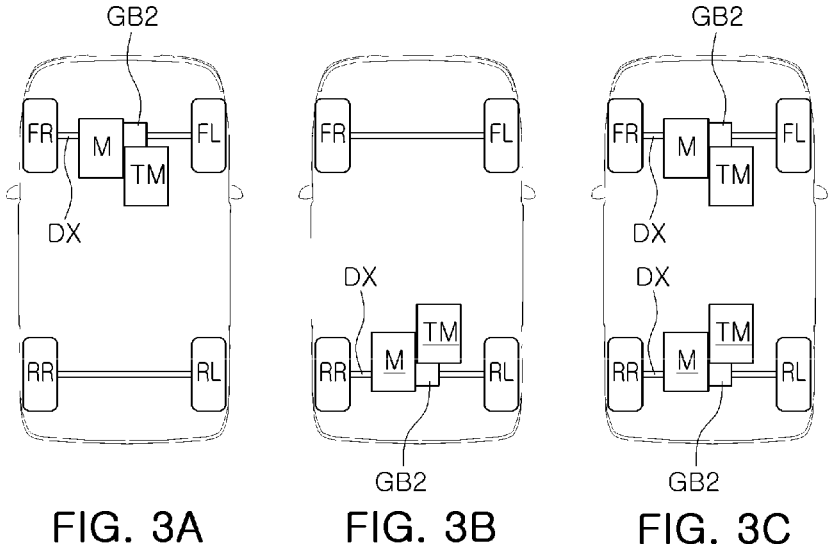
Figure 4A:
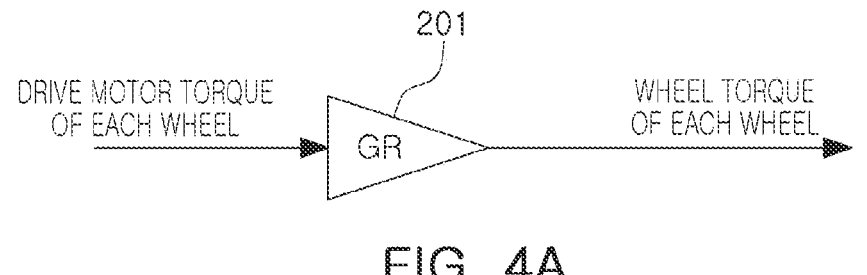
FIGS. 4A, 4B, 4C, and 4D are views illustrating a mapping relationship between a motor-based motor torque and a wheel-based wheel torque according to an embodiment of the present disclosure.
Figure 4B:
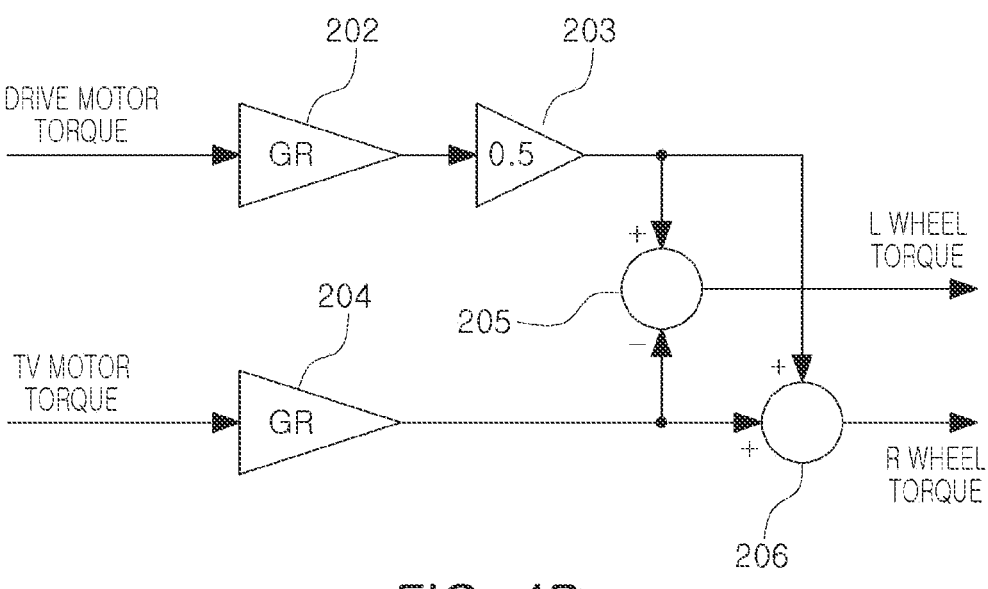
Figure 4C:
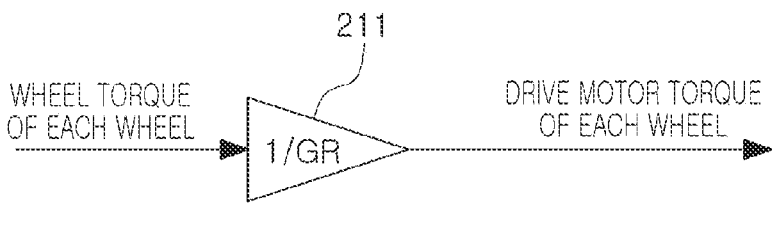
Figure 4D:
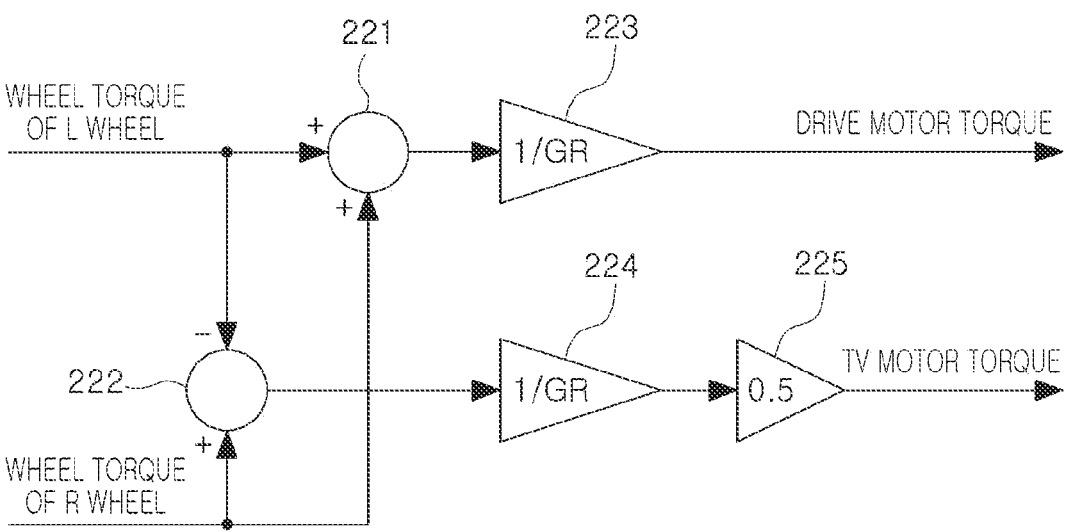

In another embodiment, a hardware platform illustrated in FIGS. 3A-3C may include a third hardware platform for driving each of a pair of left and right wheels in a combination of a drive motor M, a gearbox GB2, and a torque vectoring motor TM. FIG. 3A denotes front wheel driving, FIG. 3B denotes rear wheel driving, and FIG. 3C denotes four-wheel driving. Specifically, the drive motor M illustrated in FIGS. 3A-3C may also be referred to as an 'axle motor' because it drives a drive shaft DX.

As illustrated in FIGS. 3A-3C and FIG. 4B, the drive motor M drives the drive shaft DX according to a gear ratio 202 of the gearbox GB2, and a torque of a torque vectoring motor (TV motor) may be distributed to left and right wheels (L wheel and R wheel) according to a gear ratio 204 of the gearbox GB2.

The gear ratio 202 and the gear ratio 204 may have different values.

For example, as described in FIG. 4B, the torque of the drive motor M is multiplied by the gear ratio (GR) 202 of the gearbox GB2 and is converted into a wheel-based torque, and the converted wheel torque is multiplied by ½ in a multiplier 203 and then distributed to the L wheel and the R wheel, and is input to a subtractor 205 and an adder 206, respectively. Furthermore, the torque of the torque vectoring motor (TV motor) is multiplied by the gear ratio (GR) 204 of the gearbox GB2 and is converted into a wheel-based torque, and the converted wheel-based torque is input to the subtractor 205 and the adder 206, respectively. The subtractor 205 may subtract a wheel-based torque of a torque vectoring motor TV from a wheel-based torque of the drive motor M and may apply the torque to the L wheel, and the adder 206 may add the wheel-based torque of the drive motor M and the wheel-based torque of the torque vectoring motor TV and apply the torque to the R wheel.

Based on FIGS. 4A and 4B described above, a vehicle information providing unit 10 described below may convert the motor-based torque into the wheel-based torque and refer to a current motor torque based on wheels. It should be noted that the mapping relationship between the motor-based torque and the wheel-based torque illustrated in FIGS. 4A and 4B described above is exemplary for helping understanding of the present disclosure, and the present disclosure is not necessarily limited thereto.

Meanwhile, FIGS. 4C and 4D illustrate a mapping relationship for mapping a wheel-based torque to a motor-based torque. FIGS. 4A and 4B illustrate a mapping relationship for mapping the motor-based torque to the wheel-based torque, while FIGS. 4C and 4D illustrate a mapping relationship for mapping the wheel-based torque to the motor-based torque. A conversion unit 130 described below based on FIG. 2B described above may convert the wheel-based torque into the motor-based torque.

For example, in the case of the first hardware platform, as described in FIGS. 1A-1C and FIG. 4C, the wheel torques (i.e., wheel-based torques) of each wheel may be multiplied by an inverse (1/GR) of the gear ratio of the gearbox GB1 by a multiplier 211 and may be converted into torques (i.e., motor-based torques) of each wheel.

In the case of the second hardware platform, as illustrated in FIGS. 2A-2C and FIG. 4C, the wheel-based torque and the motor-based torque may be converted to a 1:1 ratio.

Furthermore, in the case of the third hardware platform, as illustrated in FIGS. 3A-3C and 4D, an adder 221 adds a wheel torque of the L wheel and a wheel torque of the R wheel, and then, the multiplier 223 multiplies the added torque by the inverse (1/GR) of the gear ratio of the gearbox GB2 and converts the multiplied result into the torque of the drive motor M, that is, a motor-based torque. Meanwhile, a subtractor 222 may subtract the wheel torque of the L wheel from the wheel torque of the R wheel, a multiplier 224 may multiply the subtracted torque by the inverse (1/GR) of the gear ratio of the gearbox GB2 and convert the same into the torque of the drive motor, and then, a multiplier 225 may multiply a resulting torque by 0.5 and convert the same into a torque of the torque vectoring motor (TV motor), that is, a motor-based torque.

Figure 5:
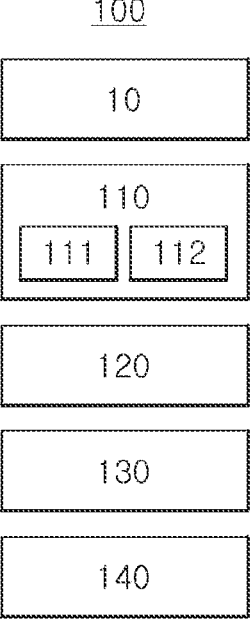
FIG. 5 is an internal block diagram of an apparatus for controlling motor-based torque vectoring according to an embodiment of the present disclosure.

Meanwhile, FIG. 5 is an internal block diagram of an apparatus 100 for controlling motor-based torque vectoring according to an embodiment of the present disclosure, and the apparatus 100 for controlling motor-based torque vectoring may include a vehicle information provision unit 10, a calculation unit 110, a distribution unit 120, and a conversion unit 130.

According to an exemplary embodiment of the present disclosure, the apparatus 100 may include a processor (e.g., computer, microprocessor, CPU, ASIC, circuitry, logic circuits, etc.) and an associated non-transitory memory storing software instructions which, when executed by the processor, provides the functionalities of the vehicle information provision unit 10, the calculation unit 110, the distribution unit 120, and the conversion unit 130. Herein, the memory and the processor may be implemented as separate semiconductor circuits. Alternatively, the memory and the processor may be implemented as a single integrated semiconductor circuit. The processor may embody one or more processor(s).

Specifically, the vehicle information providing unit 10 may sense, estimate and provide vehicle information required for motor-based torque vectoring control. The vehicle information may include a vehicle speed, a yaw rate, a steering angle, a lateral slip angle, and a lateral acceleration.

Meanwhile, the calculation unit 110 may obtain a target yaw moment so that a yaw rate of the electric vehicle follows a target yaw rate. The calculation unit 110 may include a first calculation unit 111 and a second calculation unit 112.

Figure 6:
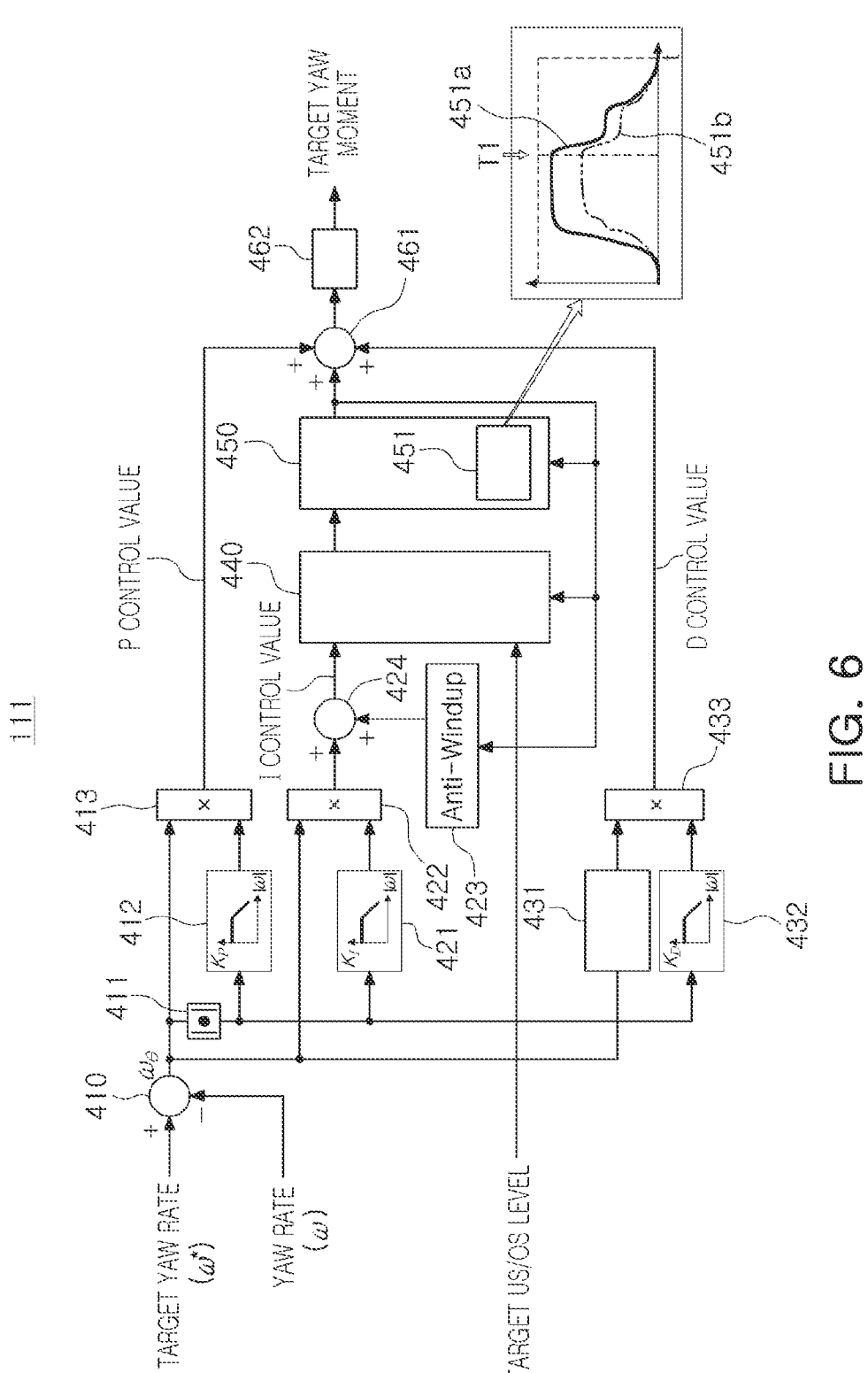
FIG. 6 is a detailed block diagram of a first calculation unit 111 illustrated in FIG. 3.

Specifically, FIG. 6 is a detailed block diagram of the first calculation unit 111 illustrated in FIG. 5.

Hereinafter, referring to FIG. 6, the first calculation unit 111 will be described in detail.

Referring to FIG. 6, the first calculation unit 111 may obtain a target yaw moment through PID control based on an error between a target yaw rate and a yaw rate.

For the PID control, the first calculation unit 111 may include proportional modules 411, 412 and 413 for generating a proportional (P) control value, integral modules 411, 421 422 and 424 for generating an integral (I) control value, and differential modules 411, 431, 432 and 433 for generating a differential (D) control value.

The proportional modules 411, 412 and 413 may output a proportional (P) control value based on a yaw rate error between a target yaw rate and a yaw rate output from the subtractor 410.

Specifically, an absolute value of the yaw rate error is taken through an absolute value module 411, and a proportional gain $K_P$ is extracted from an absolute value $|\omega_e|$ through a gain scheduler 412. Then, a proportion (P) control value may be obtained by multiplying the proportion gain $K_P$ and a yaw rate error $\omega_e$ in the multiplier 413.

The integral modules 411, 421, 422 and 424 may output the integral (I) control value based on the yaw rate error between the yaw rate and the yaw rate output from the subtractor 410.

Specifically, the absolute value of the yaw rate error is taken through the absolute value module 411, and an integral gain $K_I$ is extracted from the absolute value $|\omega_e|$ through a gain scheduler 421. The integral (I) control value may then be obtained by multiplying the integral gain $K_I$ and the yaw rate error by the multiplier 422, and then adding and integrating the multiplied value with an integral (I) control value of a previous operation in the adder 424. According to an embodiment of the present disclosure, an anti-windup control module 423 may be further included. By including the anti-windup control module 423, the reactivity of future torque changes may be secured by reducing the accumulated error when the torque is saturated.

Meanwhile, according to an embodiment of the present disclosure, an output of the integrated modules 411, 421, 422 and 424 may further include a first module 440 and a second module 450.

The first module 440 may receive a current value of the integral (I) control value and a fed-back previous value thereof, and when a difference between the current value and the previous value is greater than or equal to a preset threshold, the threshold may be output as an integral (I) control value for PID control, and when the difference between the current value and the previous value is less than the preset threshold value, the current value may be output as an integral (I) control value for PID control.

According to an embodiment of the present disclosure, the above-described threshold value may be adjusted according to a driver's driving tendency or a driving situation.

For example, first, the threshold may be set based on a steering angular speed and a target yaw rate change ratio to limit a torque slope based on the driver's intention. Based on the steering angular speed, linearity that exactly matches the driver's intention may be provided, and based on the target yaw rate change ratio, a sense of late drying or stretching may be additionally provided along with basic linearity. Since each driver may have a preferred characteristic, the threshold may be selected according to a driving mode. Furthermore, the threshold may be set based on target characteristics of the vehicle, and when the target characteristics of the vehicle set by the driver are an oversteer (OS) tendency as compared to a basic vehicle, a size of the threshold may be increased in proportion to a target OS level.

On the other hand, when the target characteristics of the vehicle set by the driver are an understeer (US) tendency as compared to the basic vehicle, the size of the threshold may be reduced in proportion to the target US level. Here, an OS tendency as compared to the basic vehicle may denote a target behavior of the driver who desires to move a vehicle at a yaw rate greater than a target yaw rate corresponding to a current steering angle, and an US tendency as compared to the basic vehicle may denote a target behavior of the driver who desires to move a vehicle at a yaw rate less than the target yaw rate corresponding to the current steering angle. Accordingly, when the target behavior is the OS tendency and an OS level is large, a slight change in the steering angle may result in a greater yaw rate for the vehicle (considering the agility of the vehicle), and conversely, when the target behavior is the US tendency and the US level is large, the yaw rate of the vehicle may be low even if the steering angle is turned large (considering the stability of the vehicle).

Meanwhile, when the target yaw rate starts to decrease, the second module 450 may decrease the integral (I) control value by a ratio at which the target yaw rate decreases.

That is, as illustrated in reference numeral 451, the second module 450 may reduce an integral (I) control value 451*b* by a ratio in which a target yaw rate 451*a* decreases from a point of time TI when the target yaw rate 451*a* starts to decrease.

That is, according to an embodiment of the present disclosure, when the steering angle is switched to a neutral state (OnCenter or Neutral) in a turning situation, the integral (I) control value by the ratio at which the target yaw speed decreases may be reduced to eliminate the sense of heterogeneity caused by the remaining lateral slip angle as well as to secure the straightness of the vehicle.

Furthermore, when a maximum value of the integral (I) control value is additionally limited, when the driver's heterogeneity or torque vectoring control in drift situations is turned off by setting the integral (I) control value to '0' upon turning off the drift situation or the torque vectoring control, or when the torque vectoring control is initiated again, the second module 450 may suppress a sense of heterogeneity in which the vehicle moves differently from the driver's intention.

Meanwhile, the differential modules 411, 431, 432 and 433 may output a differential (D) control value based on the yaw rate error between the target yaw rate and the yaw rate output from the subtractor 410.

Specifically, the absolute value of the yaw rate error is taken through an absolute value module 411, and a differential gain $K_D$ is extracted from an absolute value $|\omega_e|$ through a gain scheduler 432. Furthermore, a shaping module 431 differentiates the yaw rate error to obtain a yaw acceleration and then performs shaping on the yaw acceleration. For example, the shaping module 431 may perform the shaping by passing the yaw acceleration through a low pass filter (LPF) and then limiting maximum or minimum values. Then, by multiplying the differential gain $K_P$ and the shaped yaw acceleration by the multiplier 433, a differential (D) control value may be obtained.

The proportional (P) control value, the integral (I) control value, and the differential (D) control value described above may be added by the adder 461 and output as a target yaw moment. According to an embodiment of the present disclosure, a limiting module 462 may be further included to limit maximum or minimum values of the total sum of the proportional (P) control value, the integral (I) control value, and the differential (D) control value output from the adder 461.

The gain scheduler 412, 421 and 432 described above is intended to apply a linear control design method to a nonlinear system, and to design gains $K_P$, $K_I$ and $K_D$ differently depending on operating conditions (i.e., a yaw rate error).

In describing the present disclosure, although the PID control is mainly described in describing the present disclosure, the present disclosure is not limited thereto, it should be noted that the present disclosure may be applied to all control algorithms (e.g., all control algorithms that use integral concepts as various non-linear control methods, such as adaptive control, sliding mode control, robust control such as feedback linearization, and predictive control such as model predictive control) including a concept of integrated control.

Figure 7:
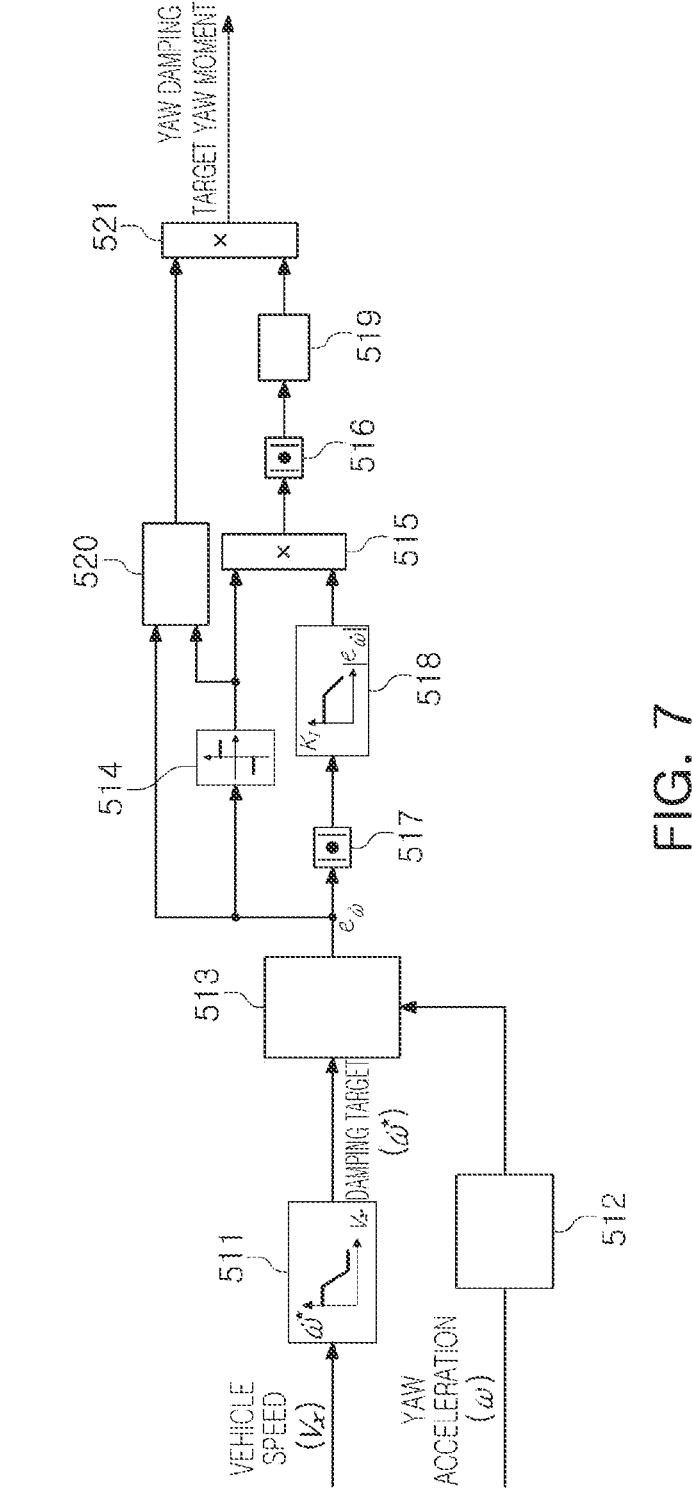
FIG. 7 is a detailed block diagram of a second calculation unit 112 illustrated in FIG. 3.

Meanwhile, FIG. 7 is a detailed block diagram of the second calculation unit 112 illustrated in FIG. 5.

Hereinafter, the second calculation unit 112 will be described in detail with reference to FIG. 7. Hereinafter, a damping goal is described as an example of the yaw acceleration, but it should be noted that a lateral slip angle change ratio may be used as a damping goal instead of the yaw acceleration, or a weighted sum of the yaw acceleration and the lateral slip angle change ratio may be used as the damping goal.

Referring to FIG. 7, the second calculation unit 112 may calculate a yaw acceleration error between a damping target (target yaw acceleration) according to a vehicle speed and a yaw acceleration, and then multiply the obtained yaw acceleration error by a gain, thus obtaining a target yaw moment by yaw damping.

Specifically, the target yaw acceleration is extracted from the vehicle speed through a gain scheduler 511 and transmitted to an error calculation module 513, and the yaw acceleration shaped through the shaping module 512 is transmitted to the error calculation module 513. The shaping module 512 may perform the shaping by passing the yaw acceleration through the low pass filter (LPF).

The error calculation module 513 calculates a yaw acceleration error between a damping target and the shaped yaw acceleration. Here, when the yaw acceleration is positive, the damping target may be a threshold positive value of a preset size, and when the yaw acceleration is negative, the damping target may be a threshold negative value of a preset size. Specifically, when a positive yaw acceleration is greater than a positive damping target and when a negative yaw acceleration is less than a negative damping target, the error calculation module 513 may obtain the yaw acceleration error by subtracting the shaped yaw acceleration from the damping target. However, when the yaw acceleration has a value between the positive damping target and the negative damping target, the yaw acceleration error may be set to 0. That is, in this case, even if the yaw acceleration is not controlled, there is no problem with vehicle stability.

Then, an absolute value of the yaw acceleration error may be taken through an absolute value module 517, and a gain K may be extracted from the absolute value through a gain scheduler 518. Meanwhile, a code module 514 extracts a code of the yaw acceleration error and converts the yaw acceleration error into +1 or −1. That is, when the yaw acceleration error is negative, it is converted to −1, and when the yaw acceleration error is positive, it is converted to +1. Then, the multiplier 515 may multiply an output of the code module 514 and the gain scheduler 518. Then, an absolute value may be obtained for an output of the multiplier 515 through an absolute value module 516, and the absolute value may be transmitted to a multiplier 521. If necessary, a slope of the absolute value, which is the output of the multiplier 515, may be limited by having a limiting module 519.

Meanwhile, when the yaw acceleration error is positive or negative, that is, when it is not 0, a code capture module 520 may multiply an output of the error calculation module 513 and an output of the code module 514 and transmit the multiplied output to the multiplier 521. Then, the multiplier 521 may obtain the yaw moment by yaw damping by multiplying an output of the code capture module 520 and an output of the limiting module 519. The yaw moment obtained in this manner by the yaw damping may be added to the yaw moment obtained by FIG. 6.

In other words, in limit situations of the vehicle (i.e., circuit driving, drift, etc.), control to follow the target yaw speed as illustrated in FIG. 6 may be insufficient to stabilize the vehicle. Accordingly, the vehicle may be stabilized by additionally obtaining the yaw moment by the yaw damping. Furthermore, by shaping the yaw moment by a method such as limiting a slope of the output of the multiplier 515, the occurrence of unwanted yaw jerk may be minimized through smooth control.

Referring back to FIG. 5, the distribution unit 120 may distribute the target yaw moment to a wheel-based target wheel torque. That is, the target yaw moment may be distributed to the wheel-based target wheel torque to satisfy a constraint condition of Equation 1 below.

$$\begin{bmatrix} Fx \\ Mz \end{bmatrix} = \begin{bmatrix} \cos\delta_{L1} & \cos\delta_{R1} & \cos\delta_{L2} & \cos\delta_{R2} \\ -t1\cos\delta_{L1}+ & -t1\cos\delta_{R1}+ & -t2\cos\delta_{L2}- & t2\cos\delta_{R2}- \\ a\sin\delta_{L1} & a\sin\delta_{R1} & b\sin\delta_{L2} & b\sin\delta_{R2} \end{bmatrix} \begin{bmatrix} F_{x,L1} \\ F_{x,R1} \\ F_{x,L2} \\ F_{x,R2} \end{bmatrix} \qquad \text{Equation 1}$$

Here, Fx may denote additional target driving force, Mz may denote a target yaw moment, t1 may denote a horizontal distance in an axle direction from a mass axis of an electric vehicle to a front wheel, t2 may denote a horizontal distance in the axle direction from the mass axis of the electric vehicle to a rear wheel, a may denote a vertical distance from the mass axis of the electric vehicle to a front wheel axle, b may denote a vertical distance from the mass axis of the electric vehicle to a rear wheel axle, $F_{x,\ L1}$ may denote drive force of a left front wheel, $F_{x,\ R1}$ may denote driving force of a right front wheel, $F_{x,\ L2}$ may denote driving force of a rear left wheel, $F_{x,\ R2}$ may denote driving force of a rear right wheel, $\delta_{L1}$ may denote the steering angle of the left front wheel, $\delta_{R1}$ may denote a steering angle of the right front wheel, $\delta_{L2}$ may denote a steering angle of the left rear wheel, and $\delta_{R2}$ may denote a steering angle of the right wheel of the rear wheel. The above-described driving forces may be converted into a wheel torque based on a dynamic rolling radius of the wheel.

For example, in the case of a rear wheel drive (RWS) type electric vehicle without rear wheel steering (RWS), when the additional target driving force is 0, a wheel torque may be obtained according to Equation 2 below.

$$\tau_{RL} = -0.5\frac{M_z}{t_2}r_{Eff} \qquad \text{Equation 2}$$

$$\tau_{RR} = +0.5\frac{M_z}{t_2}r_{Eff}$$

That is, a wheel torque $\tau_{RL}$ on a left side of the rear wheel and a wheel torque $\tau_{RL}$ on a right side may be obtained by dividing half of a target yaw moment Mz by t2 and multiplying a dynamic rolling radius diameter $r_{Eff}$ of the wheel.

Meanwhile, the conversion unit 130 may convert a wheel-based target wheel torque distributed by the distribution unit 120 into a motor-based motor torque.

Specifically, a wheel-based target wheel torque may be converted into a motor-based motor torque based on the mapping relationship between the motor torque and the wheel torque according to the hardware platform of the electric vehicle illustrated in FIG. 4D.

Specifically, for example, for the first hardware platform, as illustrated in FIGS. 1A-1C and FIG. 4C, the wheel torques of each wheel (i.e., wheel-based torques) may be multiplied by the inverse (1/GR) of the gear ratio of the gearbox GB1 by the multiplier 211 and converted into the torques of the driving motor M (i.e., motor-based torques) provided in each wheel.

In the case of the second hardware platform, the wheel-based torque and the motor-based torque may be converted to a 1:1 ratio.

Furthermore, in the case of the third hardware platform, as illustrated in FIGS. 3A-3C and FIG. 4D, the adder 221 adds the wheel torque of the L wheel and the wheel torque of the R wheel, and the multiplier 223 then multiplies the added wheel torque by the inverse (1/GR) of the gear ratio of the gearbox GB2 and converts the multiplied torque into a torque of the drive motor M, that is, a motor-based torque. Meanwhile, the subtractor 222 may subtract the wheel torque of the L wheel from the wheel torque of the R wheel, and the multiplier 224 may then multiply the subtracted torque by the inverse (1/GR) of the gear ratio of the gearbox GB2 and convert the multiplied torque into a torque of a torque vectoring motor, and then, the multiplier 225 may multiply the converted torque by 0.5 and convert the multiplied torque into a torque of a torque vectoring motor (TV motor), that is, a motor-based torque.

A storage unit 140 may be a storage medium for storing various programs for motor-based torque vectoring control described above.

Figure 8A:
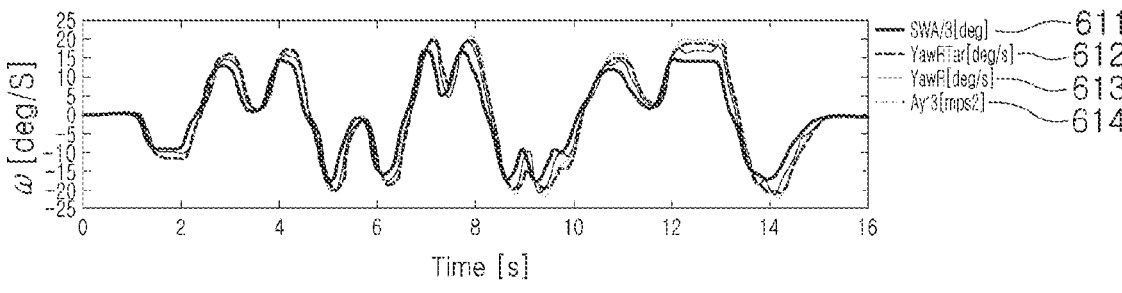
FIGS. 8A, 8B, 8C, 9A, 9B, and 9C illustrate a torque vectoring control result according to an embodiment of the present disclosure.

Meanwhile, FIG. 8A illustrates a torque vectoring control result according to an embodiment of the present disclosure, which is a control result of a rear wheel driving method FIG. 1B) in the first hardware platform.

FIG. 8A represents a control result in view of the yaw rate, where SWA/3 (611) is a steering angle (specifically, a steering angle divided by 3 to match a size), YawRTar (612) is a target yaw rate, Yaw (613) is a yaw rate, and AY*3 (614) is a lateral acceleration (specifically, a value obtained by multiplying a lateral acceleration by 3 to match a size).

Figure 8B:
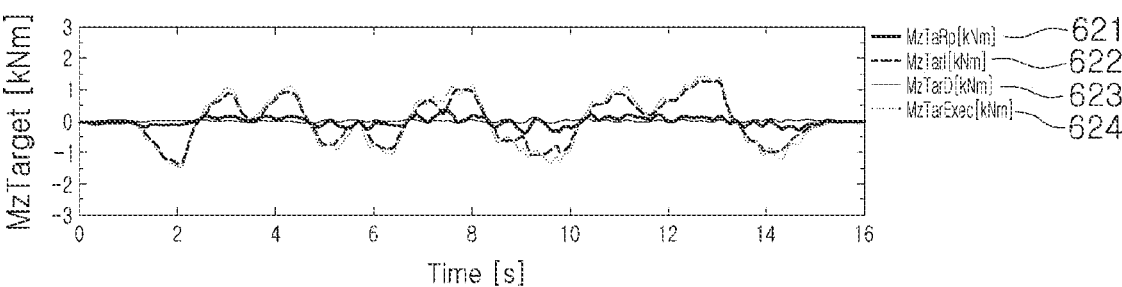

FIG. 8B represents a control result in view of a yaw moment, where MzTarP (621) is a yaw moment by a proportional control value, MzTarI (622) is a yaw moment by an integral control value, MzTarD (623) is a yaw moment by a differential control value, and MzTarExec (624) is the sum of the yaw moments by the proportional control value, the integral control value, and the differential control value.

Figure 8C:
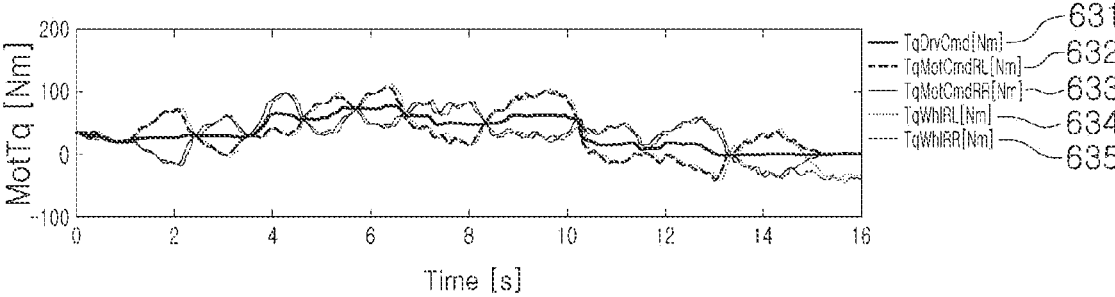

FIG. 8C represents a control result in view of a torque, where TqDrvCmd (631) is driver demand torque, TqMotCmdRL (632) is a torque command of an RL-sided motor, TqMotCmdRR (633) is a torque command of an RR-sided motor, TqWhlRL (634) is an RL-sided wheel torque, and TqWhlRR (635) is an RR-sided wheel torque.

Figure 9A:
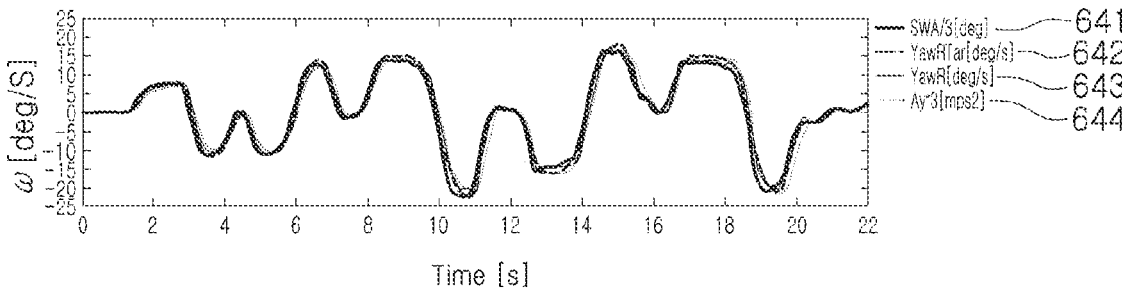
Figure 9B:
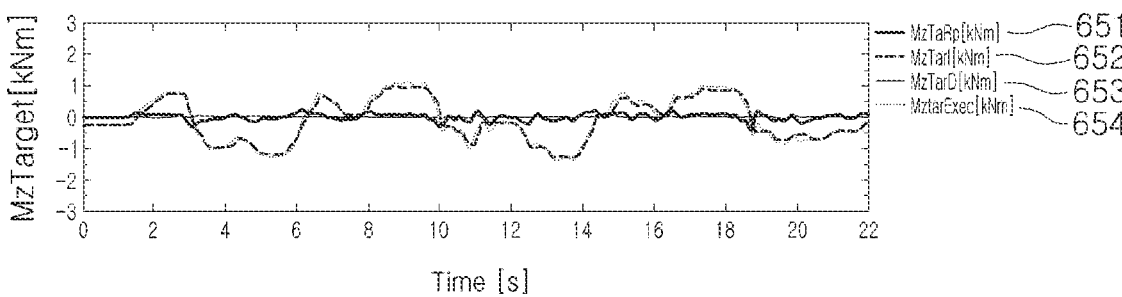
Figure 9C:
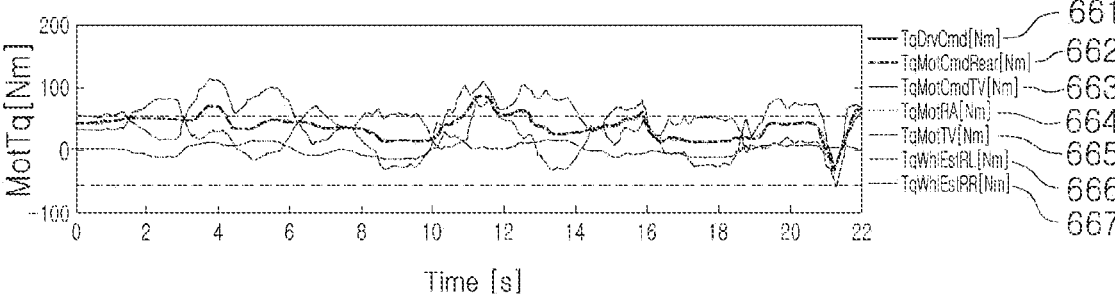

FIGS. 9A-9C illustrates a torque vectoring control result according to an embodiment of the present disclosure, which is a control result of a rear wheel driving method (see FIG. 3B) in the third hardware platform.

FIG. 9A represents a control result in view of the yaw rate, where SWA/3 (641) is a steering angle (specifically, a steering angle divided by 3 to match a size), YawRTar (642)

is a target yaw rate, Yaw (643) is a yaw rate, and AY*3 (644) is a lateral acceleration (specifically, a value obtained by multiplying the lateral acceleration by 3 to match a size).

FIG. 9B represents a control result in view of the yaw moment, where MzTarP (651) is a yaw moment by a proportional control value, MzTarI (652) is a yaw moment by an integral control value, MzTarD (651) is a yaw moment by a differential control value, MzTarExec (654) is the sum of the yaw moments by the proportional control value, the integral control value, and the differential control value.

FIG. 9C represents a control result in view of the torque, where TqDrvCmd (661) is driver demand torque, TqMotCmdRear (662) is a torque command of a drive motor, TqMotCmdTV (663) is a torque command of a torque vectoring motor, TqMotRA (664) is a torque of a drive motor, TqMotTV (665) is a torque of a torque vectoring motor, TqWhlEstRL (665) is an RL-sided wheel torque, and TqWhlEstRR (666) is an RR-sided wheel torque.

As illustrated in FIG. 8A FIG. 9A, it may be seen that the yaw rates 613 and 643 greatly follow the target yaw rates 612 and 642, and as illustrated in FIG. 8B and FIG. 9B, it may be seen that the target yaw moments 624 and 654 are well generated. Furthermore, as illustrated in FIG. 8C and FIG. 9C, even if the hardware platform of the electric vehicle is different, the mapping relationship between the motor torque and the wheel torque may be used to easily convert a wheel-based target wheel torque into a motor-based motor torque, and accordingly, it may be seen that the same control effect may be efficiently implemented on various hardware platforms without changing logic with a single control logic.

As described above, according to an embodiment of the present disclosure, the wheel-based target wheel torque may be obtained and the wheel-based target wheel torque may be converted into the motor-based motor torque using the mapping relationship between the motor torque and the wheel torque, which may reduce the hassle of performing mapping individually on various hardware platforms, and may be universally applied to various hardware platforms. In this case, when the motor torque and motor RPM are input from a control logic, a corresponding signal may be converted into a wheel-based wheel torque and wheel speed and the converted result may be received, thereby securing universality.

Furthermore, according to an embodiment of the present disclosure, when a difference between a current value and a previous value of the integral (I) control value for the PID control is greater than or equal to a preset threshold, the threshold may be limited to the integral (I) control value, thus suppressing a vibration of an electric vehicle and a resulting driver's sense of heterogeneity in a limit situation (e.g., a drift situation) due to a rapid change in a steering angular speed.

Furthermore, according to an embodiment of the present disclosure, when the steering angle is switched back to the neutral state (OnCenter or Neutral), the integral (I) control value may be reduced by the ratio at which the target yaw rate decreases, thereby removing the sense of heterogeneity caused by the remaining lateral slip angle and securing the straightness of the vehicle.

Figure 10:
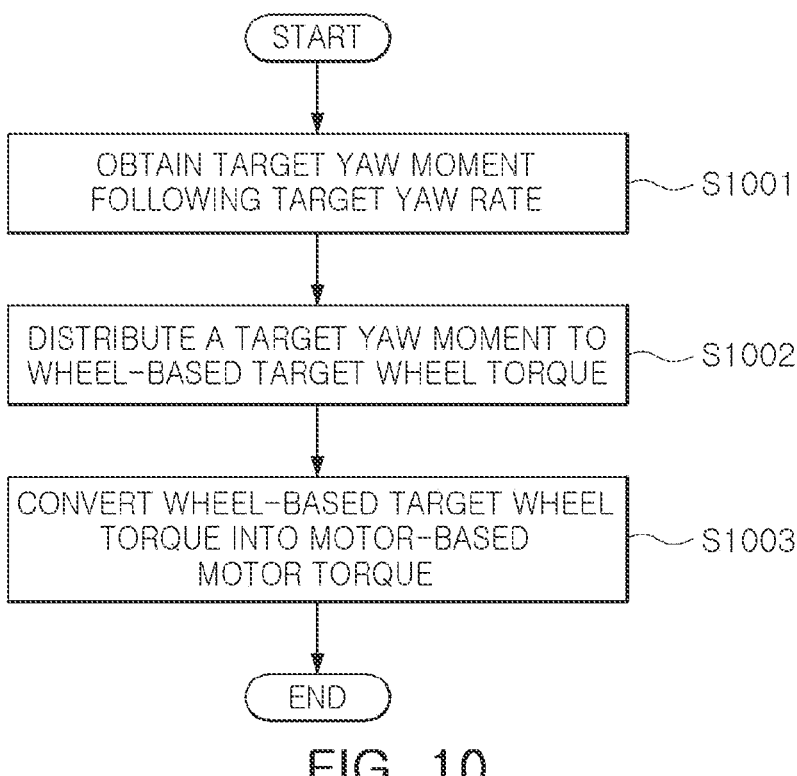
FIG. 10 is a flowchart illustrating a method for controlling motor-based torque vectoring according to an embodiment of the present disclosure.

Finally, FIG. 10 is a flowchart illustrating a method for controlling motor-based torque vectoring according to an embodiment of the present disclosure.

Hereinafter, referring to FIGS. 1 to 10, a method for controlling motor-based torque vectoring (S700) according to an embodiment of the present disclosure will be described.

Referring to FIGS. 1 to 10, the method for controlling motor-based torque vectoring control S700 according to an embodiment of the present disclosure may obtain a target yaw moment so that the yaw rate of the electric vehicle follows the target yaw rate in the calculation unit 110 at S710.

The above-described calculation unit 110 may obtain a target yaw moment through PID control based on an error between the target yaw rate and the yaw rate.

Specifically, for the integral control value for the PID control, when the difference between the current value and the previous value is greater than or equal to the preset threshold, the calculation unit 110 may output the threshold value as an integral control value for the PID control, and when the difference between the current value and the previous value is less than the preset threshold, the calculation unit 110 may output the current value as an integral control value for the PID control.

Furthermore, the calculation unit 110 may limit a torque slope based on the driver's intention by setting the threshold based on a steering angular speed and a target yaw rate change ratio, and for example, when the torque slope is limited based on the steering angular speed, linearity that exactly matches the driver's intention may be provided, and when the torque slope is limited based on the target yaw rate change ratio, a sense of late drying or stretching may be additionally provided along with basic linearity. Since each driver may have preferred characteristics, the torque slope may be selected according to a driving mode. Additionally, the threshold may be adjusted according to the driver's driving tendency or driving situation, and for example, when a target characteristic of the vehicle set by the driver is an oversteer (OS) tendency as compared to a basic vehicle, the size of the threshold relative to a target OS level may be increased, and when a target characteristic of the vehicle set by the driver is an understeer (US) relative to the basic vehicle, the size of the threshold may be reduced in proportion to a target US level.

Furthermore, when the target yaw rate starts to decrease, the calculation unit 110 may reduce the integral control value by the ratio at which the target yaw rate decreases, and when the target yaw rate finally converges to 0, the integral control value may also converge to 0 accordingly.

Furthermore, the calculation unit 110 may obtain the yaw acceleration by differentiating the yaw rate to obtain the differential control value for PID control and may shape the obtained yaw acceleration. In an embodiment, the calculation unit 110 may perform shaping for limiting a maximum value and a minimum value after low-pass filtering the yaw acceleration.

Furthermore, the calculation unit 110 may obtain more yaw moments by the yaw damping by multiplying a yaw acceleration error between a target yaw acceleration and a yaw acceleration according to the vehicle speed by a gain according to the yaw acceleration error, and the yaw moment obtained by the yaw damping may be added to the target yaw moment.

Then, the distribution unit 120 may distribute the target yaw moment to a wheel-based target wheel torque at S720.

Finally, the conversion unit 130 may convert the wheel-based target wheel torque distributed by the distribution unit 120 into a motor-based motor torque at S730.

Specifically, the conversion unit 130 may convert the wheel-based target wheel torque into the motor-based motor torque using the mapping relationship between the motor torque and the wheel torque.

According to an embodiment of the present disclosure, the mapping relationship between the motor torque and the wheel torque may be determined by the hardware platform of the electric vehicle, and the hardware platform may be a platform that can independently control the torque of each wheel using a motor.

According to an embodiment of the present disclosure, the hardware platform described above may include any one of the first hardware platform for driving a pair of left and right wheels in a combination of a pair of drive motors and a gearbox, the second hardware platform for driving each of the pair of left and right wheels with an in-wheel motor, and the third hardware platform for driving each of the pair of left and right wheels in a combination of the drive motor, the gearbox, and a torque vectoring motor.

Furthermore, the mapping relationship between the motor torque and the wheel torque may be determined by the gear ratio of the gearbox, but in the case of a second hardware platform in which the gearbox does not exist, the motor torque and wheel torque may be mapped at a 1:1 ratio, as described above.

As described above, according to an embodiment of the present disclosure, the wheel-based target wheel torque may be obtained, and the wheel-based target wheel torque may be converted into the motor-based motor torque using the mapping relationship between the motor torque and the wheel torque, which may reduce the hassle of performing mapping individually on various hardware platforms, and may be applied universally to various hardware platforms. In this case, when the motor torque and the motor RPM are received from the control logic, the corresponding signal may be converted into the wheel-based wheel torque and wheel speed and receiving the converted result, thereby securing universality.

Furthermore, according to an embodiment of the present disclosure, when difference between the current value and the previous value of the integral (I) control value for the PID control is greater than or equal to the preset threshold according to the driving situation, the threshold may be limited to the integral (I) control value, thereby suppressing the vibration of the electric vehicle and the resulting driver's sense of heterogeneity in a limit situation (e.g., a turning situation with a large lateral acceleration (Ay) or a situation in which oversteer starts to occur, or a drift situation) due to a sudden change in the steering angular speed.

In addition, according to an embodiment of the present disclosure, when the steering angle is switched to the neutral state (OnCenter or Neutral) in the turning situation, the integral (I) control value may be reduced by the ratio at which the target yaw rate decreases, thereby removing the sense of heterogeneity caused by the remaining lateral slip angle and securing the straightness of the vehicle.

Figure 11:
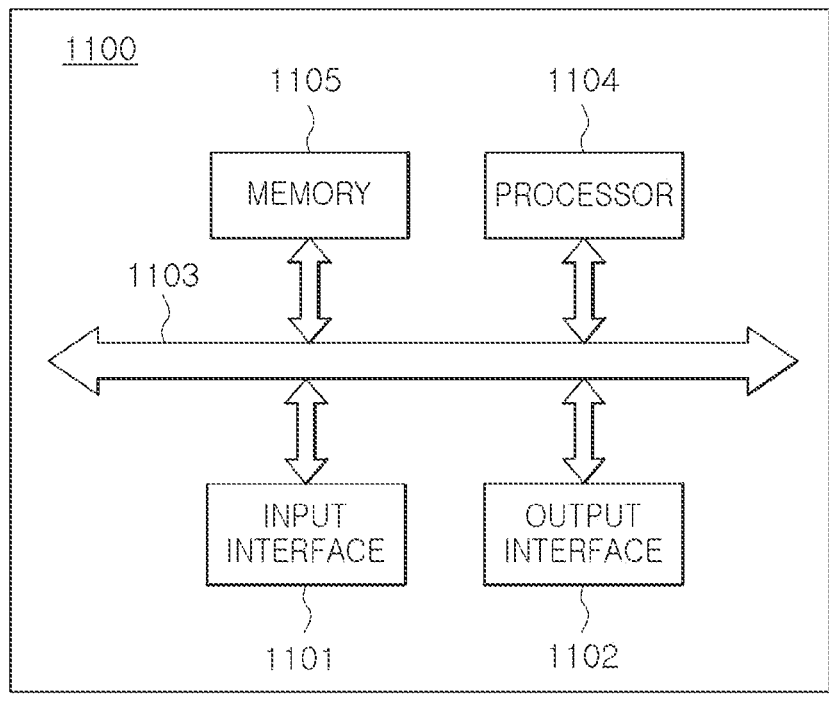
FIG. 11 is a block diagram of a computer device capable of entirely or partially implementing an apparatus for controlling motor-based torque vectoring according to an embodiment of the present disclosure.

Meanwhile, FIG. 11 is a block diagram of a computer device capable of entirely or partially implementing an apparatus 100 for controlling motor-based torque vectoring according to an embodiment of the present disclosure, which may be applied to the apparatus 100 for controlling motor-based torque vectoring control illustrated in FIG. 5.

As illustrated in FIG. 11, a computer device 800 includes an input interface 801, an output interface 802, a processor 804, and a memory 805, and the input interface 801, the output interface 802, the processor 804, and the memory 805 may be interconnected through a system bus 803.

In an embodiment of the present disclosure, the memory 805 is used to store programs, instructions, or codes, and the processor 804 may perform the programs, the instructions, or the codes stored in memory 805, may receive a signal by controlling the input interface 801, and may transmit the signal by controlling the output interface 802. The above-described memory 805 may include a read-only memory and a random access memory, and may provide instructions and data to the processor 804.

In an embodiment of the present disclosure, the processor 804 may be a central processing unit (CPU), and should be understood as other general-purpose processors, a digital signal processor (DSP), an application specific integrated circuit (ASIC), a field programmable gate array (FPGA) or other programmable logic devices, an individual gate or a transistor logic device, and an individual hardware component. The general-purpose processor may be a microprocessor, or the corresponding processor may be any conventional processor.

In an implementation process, the method performed on each device in FIG. 5 may be achieved by an integrated logic circuit of the hardware in the processor 804 or a software-type instruction. The content of a method disclosed in connection with an embodiment of the present disclosure may be implemented to be completed by performing by a hardware processor, or to be completed by a combination of hardware and software modules of the processor. The software module may be disposed in a storage medium such as a random access memory, a flash memory, a read-only memory, a programmable read-only memory, or an electrically erasable programmable memory, and a register. The storage medium is disposed in the memory 805, and the processor 804 reads information in the memory 805 and combines the information with hardware to implement the content of the method described above. In order to avoid redundancy, a detailed description is omitted here.

The present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes would be obvious to those of ordinary skill in the art.

The invention claimed is:

1. An apparatus for controlling motor-based torque vectoring, the apparatus comprising:
   one or more processors; and
   a storage medium storing instructions configured to cause the one or more processors to:
   obtain a target yaw moment following a target yaw rate;
   distribute the target yaw moment to a wheel-based target wheel torque;
   convert the wheel-based target wheel torque into a motor-based motor torque; and
   control a motor of an electric vehicle using the motor-based motor torque;
   wherein the instructions are configured to cause the one or more processors to convert the wheel-based target wheel torque into a motor-based motor torque using a mapping relationship between a motor torque and a wheel torque; and
   wherein the mapping relationship between the motor torque and the wheel torque is determined by a hardware platform of the electric vehicle,
   wherein the instructions are configured to cause the one or more processors to obtain the target yaw moment through Proportional-Integral-Derivative (PID) control based on an error between the target yaw rate and a yaw rate, and wherein the instructions are configured to cause the one or more processors to, for an integral control value for the PID control, output a preset threshold as the integral control value for the PID control when a difference between a current value and a previous value is greater than or equal to the preset threshold, and output the current value as the integral control value for the PID control when the difference between the current value and the previous value is less than the preset threshold.

2. The apparatus for controlling motor-based torque vectoring according to claim 1, wherein the hardware platform is a platform that can independently control torques of each wheel using the motor.

3. The apparatus for controlling motor-based torque vectoring according to claim 2, wherein the hardware platform includes one of a first hardware platform for driving each of a pair of left and right wheels in combination with a pair of drive motors and a gearbox, a second hardware platform for driving each of the pair of left and right wheels with an in-wheel motor, and a third hardware platform for driving each of the pair of left and right wheels in combination with a drive motor, a gearbox, and a torque vectoring motor.

4. The apparatus for controlling motor-based torque vectoring according to claim 3, wherein the mapping relationship between the motor torque and the wheel torque is determined by a gear ratio of the gearbox, and in the case of the second hardware platform in which the gearbox does not exist, the motor torque and the wheel torque are mapped at a 1:1 ratio.

5. The apparatus for controlling motor-based torque vectoring according to claim 1, wherein the instructions are configured to cause the one or more processors to:

adjust the threshold according to a driver's driving tendency; and increase a size of the threshold in proportion to a target oversteer level when the driver's driving tendency is an oversteer tendency, and decrease the size of the threshold in proportion to a target understeer level when the driver's driving tendency is an understeer tendency.

6. The apparatus for controlling motor-based torque vectoring according to claim 1, wherein the instructions are configured to cause the one or more processors to:

reduce the integral control value by a ratio at which the target yaw rate decreases when the target yaw rate starts to decrease;

wherein when the target yaw rate finally converges to 0, the integral control value also converges to 0.

7. The apparatus for controlling motor-based torque vectoring according to claim 1, wherein the instructions are configured to cause the one or more processors to:

obtain a yaw acceleration by differentiating the yaw rate in order to obtain a differential control value for the PID control; and limit a maximum value and a minimum value after low-pass filtering the yaw acceleration.

8. The apparatus for controlling motor-based torque vectoring according to claim 1, wherein the instructions are configured to cause the one or more processors to:

obtain a target yaw moment by yaw damping by multiplying a yaw acceleration error between a target yaw acceleration and a yaw acceleration according to a vehicle speed by a gain according to the yaw acceleration error;

wherein the target yaw moment by the yaw damping is added to the target yaw moment.

9. A method for controlling motor-based torque vectoring, the method comprising:

obtaining, by a processor, a target yaw moment following a target yaw rate;

distributing, by the processor, the target yaw moment to a wheel-based target wheel torque; and converting, by the processor, the wheel-based target wheel torque into a motor-based motor torque; and controlling, by the processor, a motor of an electric vehicle using the motor-based motor torque;

wherein during converting, the wheel-based target wheel torque is converted into a motor-based motor torque using a mapping relationship between a motor torque and a wheel torque; and wherein the mapping relationship between the motor torque and the wheel torque is determined by a hardware platform of the electric vehicle, wherein obtaining the target yaw moment comprises obtaining the target yaw moment through Proportional-Integral-Derivative (PID) control based on an error between the target yaw rate and a yaw rate, and wherein obtaining the target yaw moment further comprises, for an integral control value for the PID control, outputting a preset threshold as the integral control value for the PID control when a difference between a current value and a previous value is greater than or equal to the preset threshold, and outputting the current value as the integral control value for the PID control when the difference between the current value and the previous value is less than the preset threshold.

10. The method for controlling motor-based torque vectoring of claim 9, wherein the hardware platform is a platform that is configured to independently control the wheel torque of each wheel using the motor.

11. The method for controlling motor-based torque vectoring of claim 10, wherein the hardware platform includes one of a first hardware platform for driving each of a pair of left and right wheels in combination with a pair of drive motors and a gearbox, a second hardware platform for driving each of the pair of left and right wheels with an in-wheel motor, and a third hardware platform for driving each of the pair of left and right wheels in combination with a drive motor, a gearbox, and a torque vectoring motor.

12. The method for controlling motor-based torque vectoring of claim 11, wherein the mapping relationship between the motor torque and the wheel torque is determined by a gear ratio of the gearbox, and in the case of the second hardware platform in which the gearbox does not exist, the motor torque and the wheel torque are mapped at a 1:1 ratio.

13. The method for controlling motor-based torque vectoring of claim 9, wherein obtaining the target yaw moment further comprises:

adjusting the threshold according to a driver's driving tendency, wherein the adjusting the threshold comprises:

increasing a size of the threshold in proportion to a target oversteer level when the driver's driving tendency is an oversteer tendency, and decreasing the size of the threshold in proportion to the target understeer level when the driver's driving tendency is an understeer tendency.

14. The method for controlling motor-based torque vectoring of claim 9, wherein obtaining the target yaw moment comprises:

reducing the integral control value by a ratio at which the target yaw rate decreases when the target yaw rate starts to decrease, wherein when the target yaw rate finally converges to 0, the integral control value also converges to 0.

15. The method for controlling motor-based torque vectoring of claim 9, wherein obtaining the target yaw moment further comprises:

obtaining a yaw acceleration by differentiating the yaw rate in order to obtain a differential control value for the PID control, and shaping the obtained yaw acceleration, wherein the shaping the obtained yaw acceleration comprises limiting a maximum value and a minimum value after low-pass filtering the yaw acceleration.

16. The method for controlling motor-based torque vectoring of claim 9, wherein obtaining the target yaw moment further comprises:

obtaining a target yaw moment by yaw damping by multiplying a yaw acceleration error between a target yaw acceleration and a yaw acceleration according to a vehicle speed by a gain according to the yaw acceleration error, wherein the target yaw moment by the yaw damping is added to the target yaw moment.

\* \* \* \* \*